United States Patent
Barr et al.

(10) Patent No.: US 9,020,956 B1
(45) Date of Patent: Apr. 28, 2015

(54) SENTIMENT AND TOPIC BASED CONTENT DETERMINATION METHODS AND SYSTEMS

(71) Applicants: John Mathias Barr, Waterloo (CA); Somit Gupta, Seattle, WA (US)

(72) Inventors: John Mathias Barr, Waterloo (CA); Somit Gupta, Seattle, WA (US)

(73) Assignee: Google Inc., Mountain View, CA (US)

( * ) Notice: Subject to any disclaimer, the term of this patent is extended or adjusted under 35 U.S.C. 154(b) by 250 days.

(21) Appl. No.: 13/731,463

(22) Filed: Dec. 31, 2012

(51) Int. Cl.
*G06F 17/30* (2006.01)

(52) U.S. Cl.
CPC ............................. *G06F 17/30011* (2013.01)

(58) Field of Classification Search
None
See application file for complete search history.

(56) References Cited

U.S. PATENT DOCUMENTS

| | | | |
|---|---|---|---|
| 7,974,983 B2 | 7/2011 | Goeldi | |
| 2009/0319342 A1* | 12/2009 | Shilman et al. | 705/10 |
| 2010/0030648 A1 | 2/2010 | Manolescu et al. | |
| 2011/0173191 A1* | 7/2011 | Tsaparas et al. | 707/723 |
| 2011/0238496 A1 | 9/2011 | Gurbuxani et al. | |

* cited by examiner

*Primary Examiner* — Anh Tai Tran
(74) *Attorney, Agent, or Firm* — John D. Lanza; Foley & Lardner LLP (57) ABSTRACT

Aspects and implementations of the present disclosure are directed to systems and methods of selecting content for presentation to a viewing user. In general, in some implementations, a data processing system identifies a topic for a document requested by a user, determines a confidence score for a correlation between the topic and the document, determines a sentiment score for a sentiment towards the topic, and determines, for a candidate content item, a predicted acceptance score based on the confidence score, the sentiment score, and acceptance history data for the candidate content item. The data processing system selects a candidate content item for presentation to the user based, at least in part, on the predicted acceptance score.

19 Claims, 6 Drawing Sheets

| | Topic-R | Topic-P | Accept | P2P | P2Neu | P2Neg | Neu2P | Neu2Neu | Neu2Neg | Neg2P | Neg2Neu | Neg2Neg |
|---|---|---|---|---|---|---|---|---|---|---|---|---|
| 320a | RTA | ATK | Yes | Σ | Σ | Σ | Σ | Σ | Σ | Σ | Σ | Σ |
| 320b | RTA | ATK | No | Σ | Σ | Σ | Σ | Σ | Σ | Σ | Σ | Σ |
| 320c | RTB | ATK | Yes | Σ | Σ | Σ | Σ | Σ | Σ | Σ | Σ | Σ |
| 320d | RTB | ATK | No | Σ | Σ | Σ | Σ | Σ | Σ | Σ | Σ | Σ |
| | ... | ... | ... | ... | ... | ... | ... | ... | ... | ... | ... | ... |
| | RTJ | ATL | Yes | Σ | Σ | Σ | Σ | Σ | Σ | Σ | Σ | Σ |
| 320z | RTJ | ATL | No | Σ | Σ | Σ | Σ | Σ | Σ | Σ | Σ | Σ |

310 | 350 Topics | 360 | 370 Aggregate Sentiment Scores

Positivity ( Sentiment ) = Max( 0, Sentiment )

Negativity ( Sentiment ) = −1 * Min( 0, Sentiment )

Neutrality ( Sentiment ) = 1 − |Sentiment|

1 = Positivity ( Sentiment ) + Negativity ( Sentiment ) + Neutrality ( Sentiment )

— 410

ASW(Topic-R, Topic-P, Accept) = [P2P, P2Neu, P2Neg, Neu2P, Neu2Neu, Neu2Neg, Neg2P, Neg2Neu, Neg2Neg]

SW(Topic-R, Topic-P) = [P2P, P2Neu, P2Neg, Neu2P, Neu2Neu, Neu2Neg, Neg2P, Neg2Neu, Neg2Neg]

— 420

$$STR(\text{Topic-R, Topic-P}) = \frac{ASW(\text{Topic-R, Topic-P, Yes}) \cdot SW(\text{Topic-R, Topic-P})}{ASW(\text{Topic-R, Topic-P, Yes}) \cdot SW(\text{Topic-R, Topic-P}) + ASW(\text{Topic-R, Topic-P, No}) \cdot SW(\text{Topic-R, Topic-P})}$$

$MTR(\text{Topic-R}_{1..n}, \text{Topic-P}, W_{1..n}) = W_1 * STR(\text{Topic-R}_1, \text{Topic-P}, W_1) + \ldots + W_n * STR(\text{Topic-R}_n, \text{Topic-P}, W_n)$ Adjusted_MTR(x) = ( SS * MTR(x) ) + ( ( 1 − SS ) * SAR )

— 430

Note:

$A \cdot B = \sum a_i * b_i, \text{ for } i = 1 \ldots n, A = [a_1, a_2, \ldots, a_n], B = [b_1, b_2, \ldots, b_n]$ $A \cdot B = (a_1 * b_1) + (a_2 * b_2) + \ldots + (a_n * b_n)$

SENTIMENT AND TOPIC BASED CONTENT DETERMINATION METHODS AND SYSTEMS

BACKGROUND

The Internet is an international data network connecting personal computing devices and servers. The Internet enables people to access a wide variety of content. Images, audio, video, and web pages for many different topics are accessible via the Internet. The Internet provides an opportunity for content providers to present content to users. Content is generally served as part of a document, for example, as text, audio or visual media, or interactive elements. Documents, or the content of documents, can be presented, for example, as a web page.

Many Internet content providing methods customize content based on information related to the user who is viewing a document. For example, characteristics and/or interests of the viewing user may be used to choose content that is likely to capture the attention of the content viewer. Such systems fail to account for opportunities that may exist in the interaction of the user with other content available on the Internet.

SUMMARY

Aspects and implementations of the present disclosure are directed to systems and methods of selecting content for presentation to a viewing user. In general, in some implementations, a data processing system identifies a topic for a document requested by a user, determines a confidence score for a correlation between the topic and the document, determines a sentiment score for a sentiment towards the topic, and determines, for a candidate content item, a predicted acceptance score based on the confidence score, the sentiment score, and acceptance history data for the candidate content item. The data processing system selects a candidate content item for presentation to the user based, at least in part, on the predicted acceptance score.

At least one aspect is directed to computer implemented methods of selecting content for presentation to a user. The methods include identifying a first topic for a document requested by a user; determining a first confidence score for a correlation between the first topic and the document; determining a first sentiment score for a sentiment towards the first topic; and determining, for a candidate content item, a predicted acceptance score based on the first confidence score, the first sentiment score, and acceptance history data for the candidate content item. The methods include selecting the candidate content item for presentation to the user, by a computer system, from amongst a plurality of candidate content items, based, at least in part, on the predicted acceptance score.

The methods may include identifying an additional topic for the document, determining an additional confidence score for a correlation between the additional topic and the document, and determining an additional sentiment score for a sentiment towards the additional topic. The methods may include determining the predicted acceptance score for the candidate content item based on the additional confidence score and the additional sentiment score. The methods may include identifying a plurality of topics for the document and determining, for each topic of the plurality of topics, a respective confidence score for a correlation between the respective topic and the document, such that a sum of all determined confidence scores for the document is a mathematical constant. The methods may include determining the predicted acceptance score for the candidate content item by determining a ratio of sentiment scores.

At least one aspect is directed to a system of selecting content for presentation to a user. The system includes one or more processors further configured to identify a first topic for a document requested by a user; determine a first confidence score for a correlation between the first topic and the document; determine a first sentiment score for a sentiment towards the first topic; and determine, for a candidate content item, a predicted acceptance score based on the first confidence score, the first sentiment score, and acceptance history data for the candidate content item. The one or more processors are configured to select the candidate content item for presentation to the user, from amongst a plurality of candidate content items, based, at least in part, on the predicted acceptance score.

The system may include one or more processors configured to identify an additional topic for the document, determine an additional confidence score for a correlation between the additional topic and the document, and determine an additional sentiment score for a sentiment towards the additional topic. The system may include one or more processors configured to determine the predicted acceptance score for the candidate content item based on the additional confidence score and the additional sentiment score. The system may include one or more processors configured to identify a plurality of topics for the document and determine, for each topic of the plurality of topics, a respective confidence score for a correlation between the respective topic and the document, such that a sum of all determined confidence scores for the document is a mathematical constant. The system may include one or more processors configured to determine the predicted acceptance score for the candidate content item by determining a ratio of sentiment scores.

At least one aspect is directed to a computer-readable storage medium storing processor-executable instructions, which, when executed by one or more processors, cause the one or more processors to identify a first topic for a document requested by a user; determine a first confidence score for a correlation between the first topic and the document; determine a first sentiment score for a sentiment towards the first topic; and determine, for a candidate content item, a predicted acceptance score based on the first confidence score, the first sentiment score, and acceptance history data for the candidate content item. The instructions, when executed, cause the one or more processors to select the candidate content item for presentation to the user, from amongst a plurality of candidate content items, based, at least in part, on the predicted acceptance score.

The instructions, when executed, may cause the one or more processors to identify an additional topic for the document, determine an additional confidence score for a correlation between the additional topic and the document, and determine an additional sentiment score for a sentiment towards the additional topic. The instructions, when executed, may cause the one or more processors to determine the predicted acceptance score for the candidate content item based on the additional confidence score and the additional sentiment score. The instructions, when executed, may cause the one or more processors to identify a plurality of topics for the document and determine, for each topic of the plurality of topics, a respective confidence score for a correlation between the respective topic and the document, such that a sum of all determined confidence scores for the document is a mathematical constant. The instructions, when executed, may cause the one or more processors to determine the predicted acceptance score for the candidate content item by determining a ratio of sentiment scores.

In some implementations of the methods, system, and media, the acceptance history data for a candidate content item include a content topic for the candidate content item, a document topic for a document with which the candidate content item has been presented. an indicator of a response to a presentation of the candidate content item, and at least one historic sentiment score. In some implementations, the historic sentiment score is one of a score for a sentiment towards the content topic, a score for a sentiment towards the document topic, and a score derived from a score for a sentiment towards the content topic and a score for a sentiment towards the document topic. In some implementations, the historic sentiment score is an aggregate score. In some implementations, the candidate content item has no previous presentations and the acceptance history data of the candidate content item comprises initialization information. In some implementations, the acceptance history data for the candidate content item comprises a significance indicator. In some implementations, the user is an author of the document. In some implementations, the predicted acceptance score is a predicted click-through rate.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
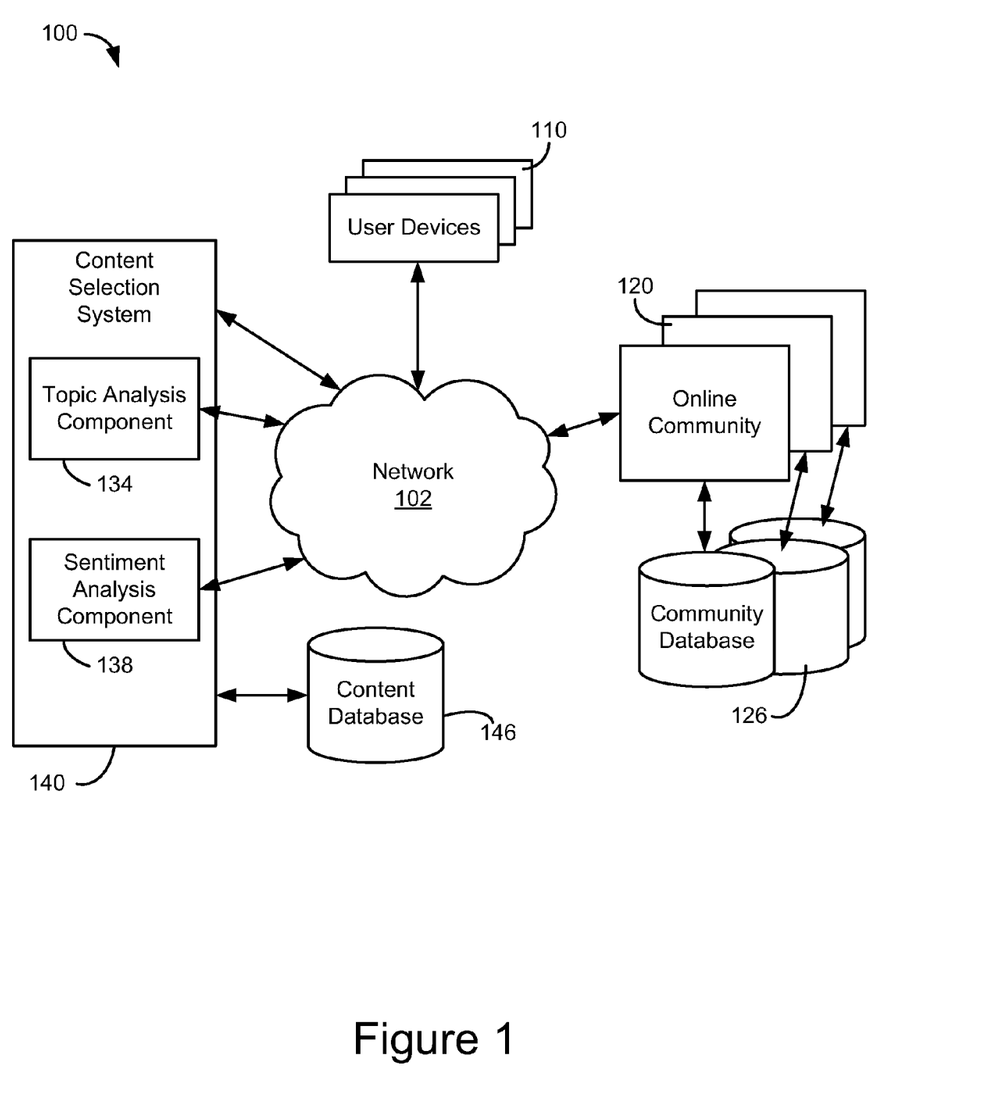
FIG. 1 is a block diagram illustrating an example content delivery system and associated environment.

FIG. 1 is a block diagram illustrating an example content delivery system and associated environment 100. User devices 110 interact via a network 102, e.g., the Internet. Users participate in various online communities 120, such as social networks, product review sites, chat rooms, news web sites, collaborative discussion pages, and wikis. Each community 120 generally stores user generated content and related information, e.g., in a respective community database 126. A content selection system 140 includes a topic analysis component 134, which identifies topics under discussion within an online community 120, and a sentiment analysis component 138, which identifies participant sentiment towards each identified topic under discussion within an online community 120. The content selection system 140 uses the resulting analysis to generate or select additional content, e.g., from a content database 146, for delivery to users participating in the online community 120.

The network 102 may be a combination of networks and devices enabling communication between the various devices and systems illustrated. Components can be interconnected by any form or medium of digital data communication. Examples of communication networks include a local area network ("LAN") and a wide area network ("WAN"), an inter-network (e.g., the Internet), and peer-to-peer networks (e.g., ad hoc peer-to-peer networks). The network 110 can include networks such as the Internet, local, metro, cable, fiber optic, telephone, power line, or wide area networks, intranets, and other communication networks such as mobile telephone networks. Networks may be wired, wireless (e.g., WiFi, WiMAX, 3G, 4G, or satellite), or a combination thereof. In some implementations, network 102 may include a media distribution network configured to distribute media programming and/or data content. The components illustrated may connect to the network 102 through intermediary devices not shown.

The user devices 110 may be any type of computing device (e.g., having a processor and memory or other type of computer-readable medium), such as a television and/or set-top box, mobile communication device (e.g., cellular telephone, smart phone, etc.), computer and/or media device (desktop computer, laptop or notebook computer, netbook computer, tablet device, gaming system, etc.), or any other type of computing device. In some implementations, one or more user devices 110 may be set-top boxes or other devices for use with a television set. In some implementations, content may be provided via a web-based application and/or an application resident on a user device 110. In some implementations, user devices 110 may be designed to use various types of software and/or operating systems. In some implementations, user devices 110 are equipped with and/or associated with one or more user input devices, e.g., keyboard, mouse, microphone, remote control, touch screen, etc., and one or more display devices, e.g., television, monitor, CRT, plasma, LCD, LED, projector, speaker, touch screen, etc. In some implementations, the user device 110 is equipped with a combination input/output device, e.g., a touch screen. In some implementations, a user's experience may be different depending on the type of user device used. The user devices 110 may be configured to receive data from various sources using a network 102.

Some users of the user devices 110 participate in an online community 120 such as a social network, a product review site, a chat room, a news web site, a collaborative discussion page, or a wiki. An online community 120 may be any networked service in which users can engage with each other and with hosted content. For example, a shopper may be able to post a review on a product review site and other shoppers may be able to comment on the review. The shoppers interact through these comments and form an online community of shoppers with a perspective on the reviewed product. In another example, a wiki is a webpage that may generally be edited by any member of a online community. Participant editors interact by modifying the work of their fellow community members. In another example, a social network is generally a collection of web pages, each page tailored to a respective community member. In some social networks, a community member may edit or contribute material to pages controlled by other members. Members can usually control who may view, edit, or contribute to the member's page. Other examples of an online community 120 include a collaborative search system, an online game, an interactive media, and a bulletin board system.

An online community 120 hosts a significant quantity of data, generally stored in a community database 126. The community database 126 may be a relational database, a flat file database, or any form of distributed data storage system of any size or structure. A community 120 may make use of multiple databases 126. Multiple communities 120 may share a single a database 126. The data may include user contributions, document text and media, user history, user profiles, and demographic data. User contributions may include posts, uploaded media, commentary, ratings such as a numerical rating or a number of stars, or other sentiment-indicating activity (e.g., "Like," "Dislike," "Up-vote," "Down-vote," "+1," or "−1").

Some online community data may be covered by a privacy policy or have other restrictions placed on usage. For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. In some implementations, user data may be processed in the aggregate. Thus, the user may have control over how information is collected about him or her and used by a content server.

A content selection system 140 selects additional content, e.g., from a content database 146, for delivery to users participating in the online community 120. The content generated or selected may be an advertisement. In some implementations, the content selection system 140 incorporates the topic analysis component 134 and the sentiment analysis component 138. In some implementations, the content selection system 140 generates content by customizing a selected content to a selected recipient. For example, the content selection system 140 may select a template from the content database 146 and populate the template with additional material tailored to the recipient. In some implementations, the content selection system 140 compares the topic and sentiment measures for a post with topic and sentiment measures for candidate content. The topic and sentiment measures for the candidate content may be predetermined for a set of topics or may be calculated as needed for any given topic, e.g., using the topic analysis component 134 and sentiment analysis component 138. In some implementations, the candidate content has additional properties. For example, the candidate content may have a presentation history with associated statistics such as an acceptance rate. A candidate content may have a weight representing the likelihood a viewer will respond positively to a presentation, e.g., by clicking on the content. The weight may be calculated based on past presentations premised on a topic and a click-through rate for those presentations. A click-through rate is a ratio of content presentations and the number of presentations where the user clicked, or otherwise interacted with, the content. An acceptance rate may be a click-through rate or any other metric for measuring acceptance by users. In some implementations, an acceptance rate is a ratio of presentations and acceptance-indicating events. Candidate content may have additional properties such as average sentiment scores for the topic.

The topic analysis component 134 identifies topics under discussion within an online community 120. In general, the topic analysis component 134 identifies topics by processing data from one or more online community databases 126. The topic analysis component 134 may access the data directly, through the network 102, or through the network 102 and an interface provided by the online community 120. In some implementations the topic analysis component 134 obtains data from the online community 120 by visiting or fetching web pages from the community 120. In some implementations the online community 120 provides a tailored interface or gateway to the topic analysis component 134. The gateway provided by the topic analysis component 134 may provide limited access, e.g., according to a privacy policy.

In some implementations, the topic analysis component 134 identifies one or more topics for a particular post, comment, or text provided by a user to an online community 120. In some implementations, in some scenarios, the topic analysis component 134 may identify a topic from the initial subject of a series of posts or comments in an online community 120. For example, posts with reviews on a website for a particular product may have that product as a topic. In some implementations, in some scenarios, the topic analysis component 134 may identify a topic from a heading or title. In some implementations, in some scenarios, a post includes a tag or other metadata identifying a topic. For example, the author may have the ability to expressly designate the topic. In some implementations, keywords are identified within the post to determine topics. A linguistic analysis of the post may be performed to determine a confidence score for the correlation between a potential topic keyword and the post.

The sentiment analysis component 138 identifies participant sentiment towards each identified topic under discussion within an online community 120. A score may be assigned to a topic representative of a participant sentiment towards the topic as determined by the sentiment analysis component 138. The sentiment score may be determined by linguistic analysis. For example, positive adjectives applied to topic keywords may indicate a positive sentiment. The sentiment score may be determined by direct user feedback. For example, the user may provide a rating for a product identified as the topic. A positive rating may indicate a positive sentiment. A sentiment score may be determined based on additional observable data. For example, if a user frequents a discussion thread, it may indicate a positive sentiment for a topic of the discussion. A sentiment score may be determined based on multiple factors.

A content database 146 may store content with associated properties for the content selection system 140. The content database 146 may be local to the content selection system 140 or accessible via a network. In some implementations, the content database 146 is accessible to the topic analysis component 134 and/or to the sentiment analysis component 138. In some implementations, the content database 146 is a relational database. In some implementations, the content database 146 is a distributed data system. In some implementations, the content database 146 stores links to content stored elsewhere on the network 102. For example, the content database 146 may store only the information necessary for the content selection system 140 to select a content, and a separate content server (not shown) provides or serves up the selected content.

Figure 2:
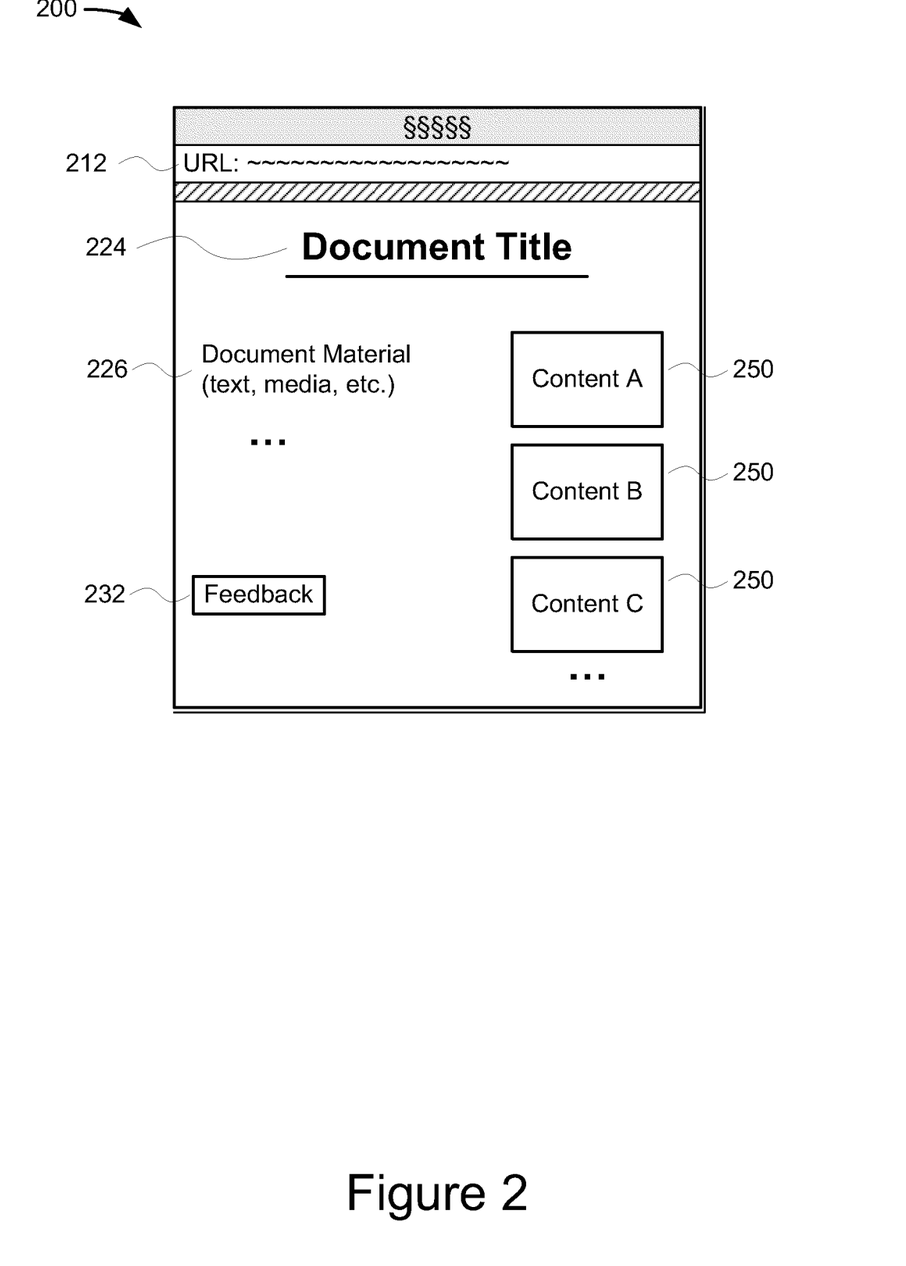
FIG. 2 is an illustration of an example document.

FIG. 2 is an illustration of an example document that may be viewed by a user. As illustrated, a document 200 may be presented by a browser, window, or other application for displaying documents. For example, the document 200 may be a web page for an online community 120. Information for the document 200 may be provided by one or more servers, e.g., web servers or data servers. The illustrated document has a source address 212, e.g., a uniform resource locator (URL). The document can be parsed into sections, e.g., a document title 224 and document body 226. The document may feature user or viewer feedback 232. The document may include one or more spaces for content 250.

The document 200 illustrated is an example; a document can take many forms and have myriad layouts. The document may be structured using hypertext markup language (HTML) and may include javascript, cascading style sheets, AJAX, and/or Flash. The document may be presented in multiple windows, e.g., where some content appears in a first window and some content appears in a second window.

The document may have a source address 212. The address may be a uniform resource locator (URL). The address may be a local file name. The address may be entered by the user, arrived at by a link, or redirected to from another address. Some elements of the document may be sourced from an address other than the address 212. For example, an image file included in the presented document may be sourced from an image server having a different address. In some implementations, the address 212 includes descriptive elements identifying the document. In some implementations, the address 212 is parsed to help identify a topic for the document.

The document can be parsed into sections, e.g., a document title 224 and document body 226. The document title 224 may help identify a topic for the document. In some implementations, the title 224 is designated by a specific tag, e.g., an XML tag or an HTML tag. In some implementations, the title 224 appears in a separate space within the document 200, e.g., in a bar above address 212. In some implementations, the title 224 is implied, e.g., from the first line of text.

The document body 226 may include a variety of material. The body 226 may include text, media, or other elements. Text may be divided into sections. In some implementations, different sections of text include indications of different authors for each section. In some implementations, the user viewing the document may be an author. For example, the user may have contributed a comment to a review site. In some implementations, the content selection system 140 may be configured to identify a user's sentiment from portions of a document contributed by the user viewing the document. In some implementations, the document includes various forms of media. Media may include images, video, audio, or interactive components. In some implementations, the content selection system 140 may be configured to identify a user's sentiment from media uploaded by the user viewing the document. For example, a user may upload an image of a product in use, which may indicate a positive sentiment for the product.

The document may feature user or viewer feedback 232. User feedback may include posts, uploaded media, commentary, product reviews, ratings such as a numerical rating or a number of stars, or other sentiment-indicating activity (e.g., "Like," "Dislike," "Up-vote," "Down-vote," "+1," or "−1"). Feedback 232 may be anonymous, aggregated, averaged, or authored. In some implementations, the content selection system 140 may be configured to identify a user's sentiment from the feedback 232. In some implementations, the content selection system 140 may be configured to identify general viewer sentiment from the feedback 232. In some implementations, a generally positive sentiment may indicate that the user would be receptive to similar content and a generally negative sentiment may indicate that the user would be receptive to alternative content. For example, a positive product review may indicate that the user would be receptive to an ad for a new version of the product or for add-ons to the product, while a negative product review may indicate that the user would be receptive to ads for a competing product.

The document may include one or more spaces for content 250. In some implementations, the content spaces 250 are for advertising content. In some implementations, the content spaces 250 are for side-topic content, e.g., a weather report or headlines on a news site. In some implementations, the content is presented by a third-party server.

In some implementations, the content placed in the content spaces 250 is selected by the content selection system 140. The content selection system 140 may select content based on past presentations. In some implementations, the content selection system 140 stores acceptance history data for content, e.g., in a content database 146.

Figure 3:
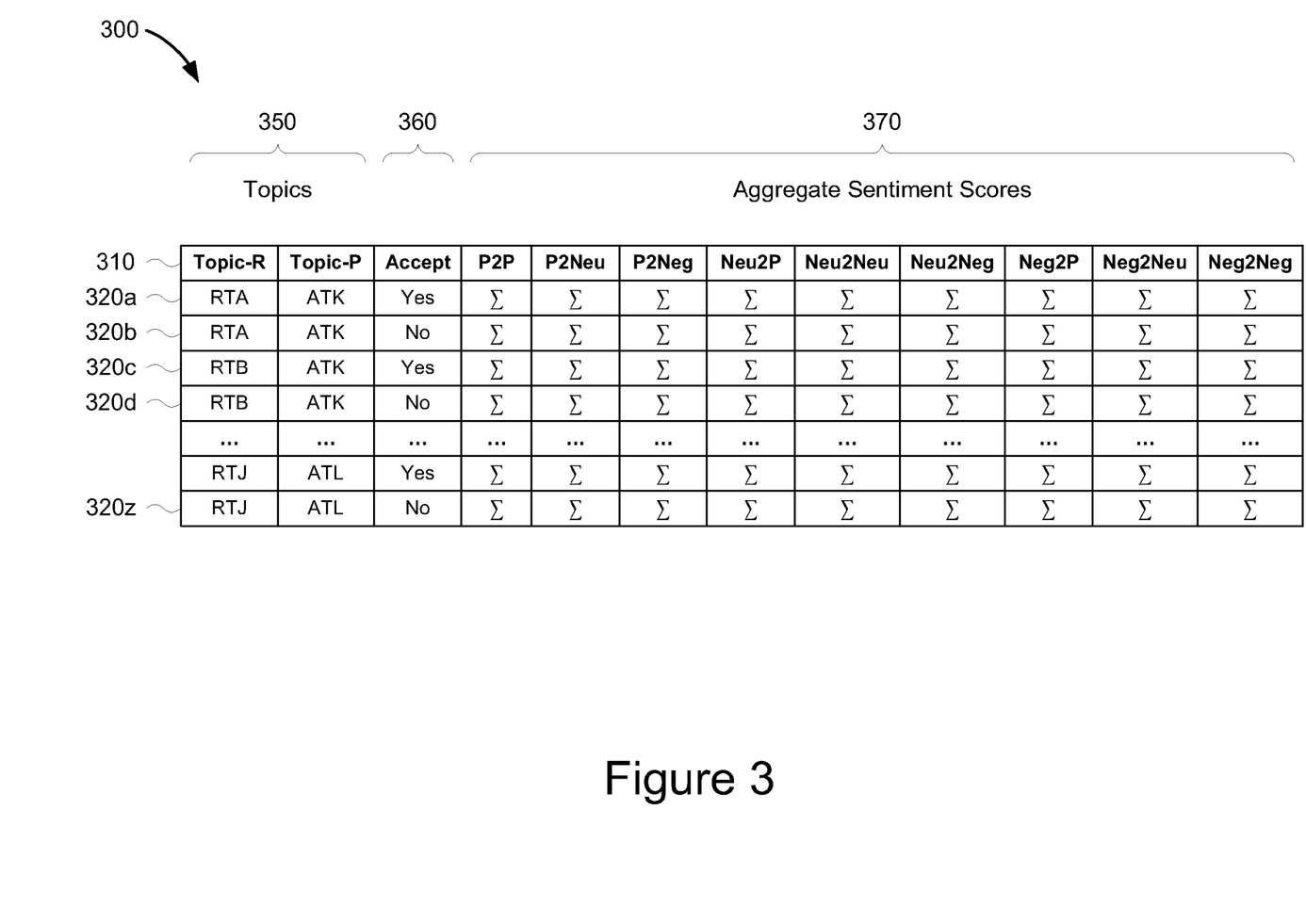
FIG. 3 is an illustration of a chart for acceptance history data.

FIG. 3 is an illustration of a chart for acceptance history data. Generally, for a particular content that may be presented to a viewer, a table 300 may be constructed or maintained. An actual data table as shown is not necessary, the table 300 is presented to demonstrate the analysis; any appropriate data structure may be used. The table 300 for a content may include topics 350, an indication of response or acceptance 360, and aggregate sentiment scores 370. The table 300 illustrated includes headers 310 and multiple rows of data 320a-z. The illustrated table 300 is for a single content. Each row 320a-z represents a topic correlation (Topic-R to Topic-P) 350 where the Topic-R is a topic identified for the requested document and the Topic-P is a topic identified for a candidate content. In some implementations, a relevance weight (not shown) is calculated as the product of a confidence score for a particular topic in the requested document (e.g., Topic-R) multiplied by a confidence score for a corresponding topic in the candidate content (e.g., Topic-P). The relevance weight includes the confidence score for the particular topic to the requested document and is therefore generally computed as needed. The row 320a-z includes a column 360 indicating whether or not the row represents a presentation resulting in an acceptance activity, e.g., where the user selected the content—sometimes referred to as a "click through." The aggregate sentiment scores 360 each represent the sum of the a sentiment comparison for the past presentations. In some implementations, the sentiment comparison scores are each determined using the relevance weight and calculations based on analysis of sentiment scores.

The headers 310 illustrated in the table 300 are not limiting and are presented for illustrative purposes only.

Each of the rows 320a-z includes aggregate data for sentiments of past presentations of the content in circumstances with the topic pair 350 and the acceptance or non-acceptance response 360. For example, the row 320a represents all past instances in which the content was presented with a document having "RTA" as a topic (see the Topic-R column) based on a topic "ATK" for the presented content (see the Topic-P column) and the user had a positive (accepting) response (see the "Accept" column 360). Each of the aggregate sentiment scores 370 is a comparison analysis of sentiment scores for the topics 350 in these past presentations.

The topic pair 350 are columns of the table 300 for topics from past documents requested and topics of the particular content item presented. In some implementations, there are two rows 320 for each topic pair 350, one for a positive acceptance and one for a negative acceptance. The table 300 illustrates an implementation wherein a content item may have multiple topics in the Topic-P column. In some implementations, content items may only have a single topic and the Topic-P column is not used.

The acceptance column 360 indicates a response from the past presentations. In some implementations, the values of the acceptance column 360 are Boolean. In some implementations, the values of the acceptance column 360 are numerical or text, for example, a rating given or an option selected. The acceptance column 360 illustrated in table 300 indicates acceptance, by the viewing user, of the content when delivered in the circumstances of the topic pair 350. For example, acceptance may be in the form of a click or other active affirmative feedback (e.g., calling a phone number in the content, hovering a mouse indicator over the content, or otherwise engaging with the content). Non-acceptance may be passive, e.g., not clicking or interacting with the content, or non-acceptance may be active negative feedback.

Figure 4:
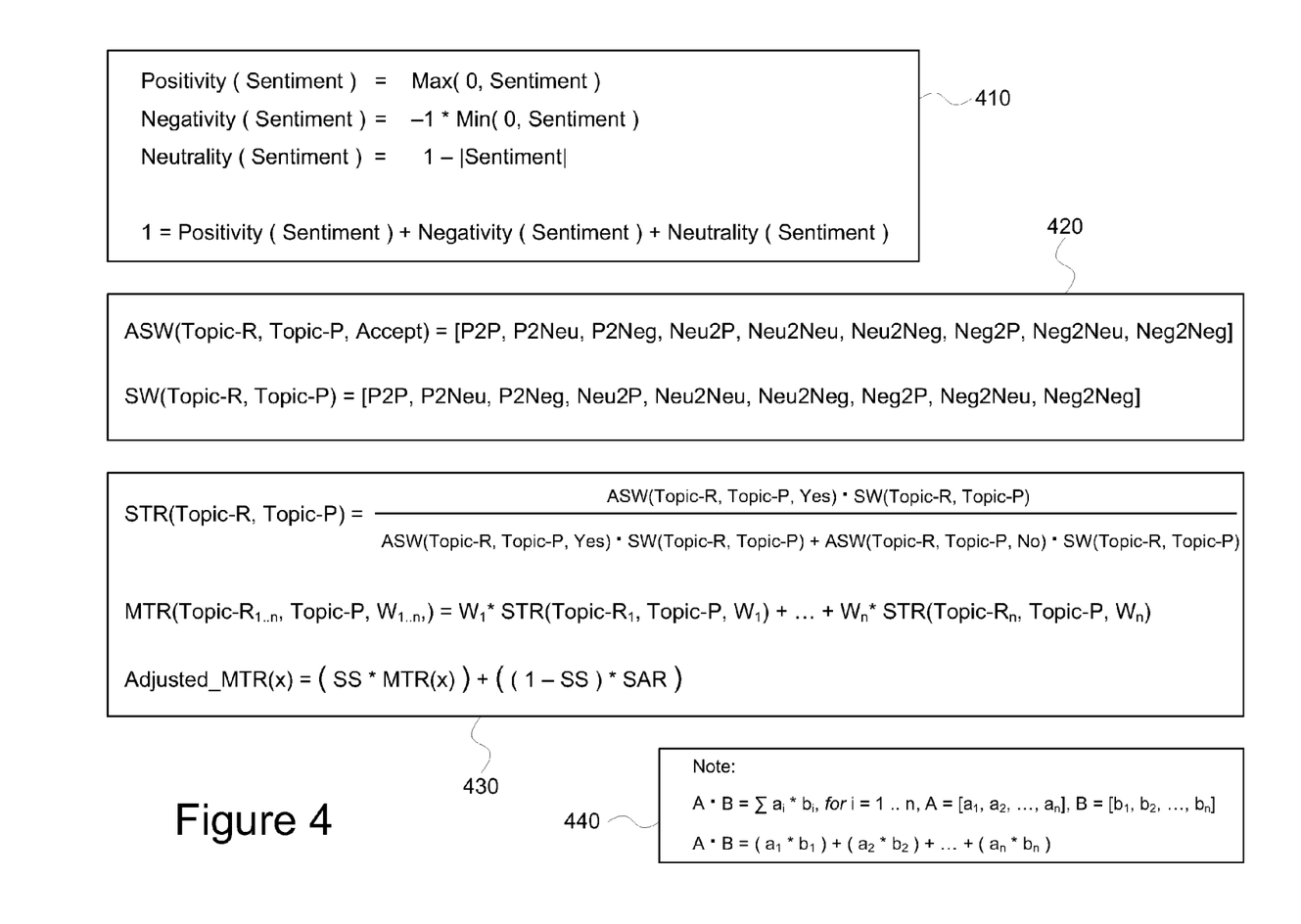
FIG. 4 is a set of formulas used in some example implementations.

The aggregate sentiment scores 370 may be determined from sentiment scores of previous presentations. Referring to FIGS. 3 and 4, in some implementations, the formulas 410 may be used to convert sentiment scores and to calculate the scores 370 illustrated in FIG. 3, e.g., as follows:

P2P equals the positivity sentiment score for a topic of the requested document multiplied by the positivity sentiment score for a corresponding topic of the candidate content, multiplied by the relevance weight.

P2Neu equals the positivity sentiment score for a topic of the requested document multiplied by the neutrality sentiment score for a corresponding topic of the candidate content, multiplied by the relevance weight.

P2Neg equals the positivity sentiment score for a topic of the requested document multiplied by the negativity sentiment score for a corresponding topic of the candidate content, multiplied by the relevance weight.

Neu2P equals the neutrality sentiment score for a topic of the requested document multiplied by the positivity sentiment score for a corresponding topic of the candidate content, multiplied by the relevance weight.

Neu2Neu equals the neutrality sentiment score for a topic of the requested document multiplied by the neutrality sentiment score for a corresponding topic of the candidate content, multiplied by the relevance weight.

Neu2Neg equals the neutrality sentiment score for a topic of the requested document multiplied by the negativity sentiment score for a corresponding topic of the candidate content, multiplied by the relevance weight.

Neg2P equals the negativity sentiment score for a topic of the requested document multiplied by the positivity sentiment score for a corresponding topic of the candidate content, multiplied by the relevance weight.

Neg2Neu equals the negativity sentiment score for a topic of the requested document multiplied by the neutrality sentiment score for a corresponding topic of the candidate content, multiplied by the relevance weight.

Neg2Neg equals the negativity sentiment score for a topic of the requested document multiplied by the negativity sentiment score for a corresponding topic of the candidate content, multiplied by the relevance weight.

In some implementations, after a presentation of a content item, the sentiment comparison scores are added to the aggregate scores recorded for the corresponding topic pair 350 and acceptance or rejection action 360. The accumulated data creates a history entry 320 for topic pairs 350. In some implementations, a data collection system implements a method of accumulating history data. For example, the data collection system identifies a condition for presentation of a content item, detects a user action (e.g., acceptance, rejection, avoidance, no action, etc.), and records history data. The recorded conditions for presentation may include a topic for the requested document, a topic for the content item, confidence scores, relevance scores, statistical significance weights, time of day, demographics, or any other related information. The history data recorded may include more or less information than illustrated in FIG. 3. In some implementations, a log file is kept with presentations and reactions. In some implementations, the acceptance history data is generated from the log file.

Referring to FIGS. 3 and 4, any one row 320a-z forms a sentiment vector ASW, such that ASW(Topic-R, Topic-P, Accept)=[P2P, P2Neu, P2Neg, Neu2P, Neu2Neu, Neu2Neg, Neg2P, Neg2Neu, Neg2Neg]. A similar vector may be generated for a candidate content as compared to the requested document, SW(Sen-Topic-R, Sen-Topic-P)=[P2P, P2Neu, P2Neg, Neu2P, Neu2Neu, Neu2Neg, Neg2P, Neg2Neu, Neg2Neg]. These vectors are illustrated in FIG. 4 at 420.

FIG. 4 is a set of formulas used in some example implementations. Formulas for converting a sentiment score to a positivity, negativity, or neutrality score are shown at 410. Sentiment vectors for a topic pair, e.g., vectors SW and ASW, are shown at 420. Formulas for converting a set of sentiment vectors to an acceptance prediction are shown at 430. The matrix function A·B, sometimes called an "inner product" or "dot product," is shown at 440.

Formulas for converting a sentiment score to a positivity, negativity, or neutrality score are shown at 410. In some implementations, the sentiment score is determined by a sentiment analysis component 138, as described above. In some implementations, sentiment for a topic is quantified as a number in the range between −1 and +1, inclusive, where +1 is completely positive, −1 is completely negative, and 0 is neutral. The sentiment score can be analyzed in several ways, e.g., as shown in 410. The sentiment can be analyzed as a positivity score in the range between 0 and 1, inclusive, where the positivity score equals the greater of 0 and the sentiment. The sentiment can be analyzed as a negativity score in the range between 0 and 1, inclusive, where the negativity score equals the absolute value of the lesser of 0 and the sentiment. The sentiment can be analyzed as a neutrality score in the range between 0 and 1, inclusive, where the neutrality score equals the 1 minus the absolute value of the sentiment. Note that in this approach, the sum of the positivity score, the negativity score, and the neutrality score is 1.

Sentiment vectors for a topic pair, e.g., vectors SW and ASW, are shown at 420, as described above. The SW vector is a set of analysis for sentiment weights for a topic of the requested document (Sen-Topic-R) and for a topic of the candidate content (Sen-Topic-P). The ASW vector is an aggregated set of analysis for sentiment weights for a topic of the requested document (Topic-R) and for a topic of the presented content (Topic-P) with acceptance result "Accept." The value of "Accept" may indicated an acceptance, e.g., "Yes", "1", "True", etc., or a non-acceptance, e.g., "No", "0", "False", etc. Note that in SW, the sentiments are determined for the viewing user, whereas in ASW, the sentiments are from an aggregate history, e.g., from the acceptance history table 300.

Formulas for converting a set of sentiment vectors to an acceptance prediction are shown at 430. The single topic acceptance rate, STR, for a topic of the requested document (Topic-R) and a topic of the candidate content (Topic-P), is shown as a ration of the dot product of the affirmative ASW vector and the SW vector divided by the sum of the dot product of affirmative ASW vector and the SW vector and the dot product of negative ASW vector and the SW vector. That is, STR=[ASW(Yes)·SW( )]/[[ASW(Yes)·SW( )]+[ASW (No)·SW( )]], for a particular Topic-R and Topic-P pair. Where a requested document has multiple topics, each topic is assigned a weight, e.g., such that the sum of the weights is 1. The STR single topic acceptance rate is calculated for each of the multiple topics and multiplied by the respective weight. The sum of the weighted STR values is the multiple topic acceptance rate, MTR. That is, MTR=$w_1$*STR (topic 1)+ . . . +$w_n$*STR(topic n).

In some implementations, where there is limited data (e.g., for a new content item with no acceptance history), techniques can be used to apply a measure of statistical significance (SS). For example, SS can be a number between 0 and 1, inclusive. In some implementations, the MTR is adjusted using a substitute acceptance rate, SAR, which may be determined from an alternative analysis of the topics, e.g., based on known rates for the respective topics as keywords without sentiment analysis. Using the measure of statistical significance (SS) and the substitute acceptance rate (SAR), an adjusted MTR can be determined for input X as Adjusted_MTR(X)=[SS*MTR(X)]+[(1−SS)*SAR], as shown at 430. X may be a topic (Topic-P) for the candidate content and n topics (Topic-$R_{1...n}$) and respective weights ($W_{1...n}$) for the requested content, suitable for use in determining a multiple topic acceptance rate, MTR.

The matrix function A·B, sometimes called an "inner product" or "dot product," is shown at 440. The dot product is the sum of the products of the respective vector elements. That is, where vector A=[$a_1, a_2, \ldots a_n$] and vector B=[$b_1, b_2, \ldots b_n$], A·B=$\Sigma a_i * b_i$, for i=1 . . . n. This may alternatively be written as A·B=($a_1*b_1$)+($a_2*b_2$)+ . . . +($a_n*b_n$).

Figure 5:
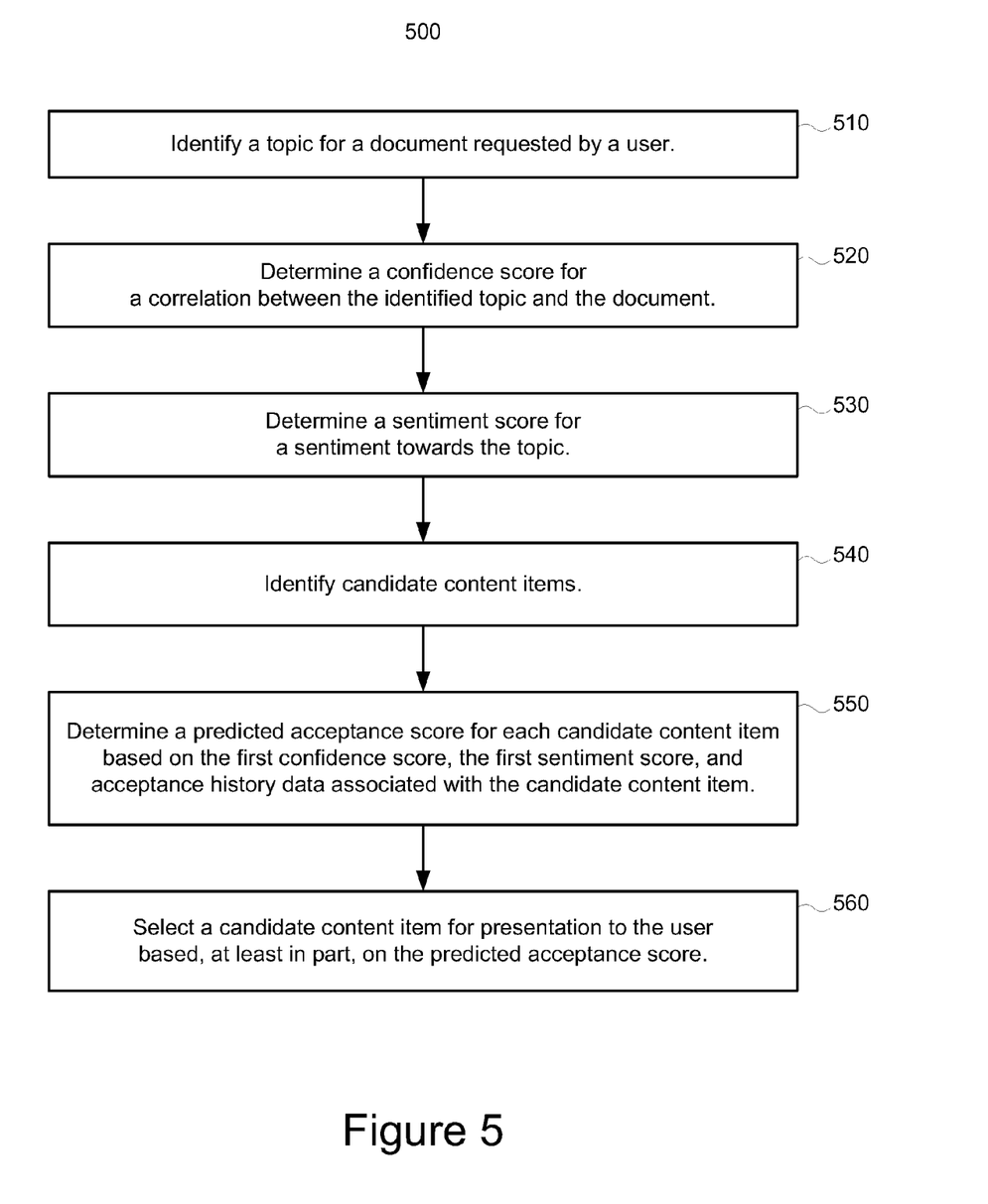
FIG. 5 is a flow diagram illustrating a method for selecting content based on a user's interactions with topics related to candidate content.

FIG. 5 is a flow diagram illustrating a method 500 for selecting content based on a user's interactions with topics related to candidate content. In general, at step 510, a content selection system 140, e.g., using a topic analysis component 134, identifies a topic for a document requested by a user and, at step 520, determines a topic correlation score for a correlation between the identified topic and the document. At step 530, the content selection system 140, e.g., using a sentiment analysis component 138, determines a sentiment score for a sentiment towards the topic. At step 540, the content selection system 140, e.g., using a content database 146, identifies one or more candidate content items, each candidate content associated with performance history data for previous presentations of the candidate content. At step 550, the content selections system 140 determines a predicted acceptance score for each candidate content item based on acceptance history data associated with the respective candidate content items and, at step 560, selects at least one candidate content item for presentation to the user based, at least in part, on the predicted acceptance score.

At step 510, the content selection system 140 identifies a topic for a document requested by a user. Generally, the content selection system 140 process a document requested by the user. For example, the user may have requested a web page from an online community 120. The content selection system 140 parses the requested document and determines at least one topic. In some implementations, the topic identification is performed by a topic analysis component 134, as described above. In some implementations, a topic is identified from a header, e.g., a title or subject line. In some implementations, a topic is identified from an express statement, e.g., a hidden HTML tag. In some implementations, a topic is identified from linguistic analysis. In some implementations, a topic is identified from frequently appearing keywords. A document may have multiple topics.

At step 520, the content selection system 140 determines a topic confidence score for a correlation between the identified topic and the document. In some implementations, the confidence score for a topic is a number in the range between 0 and 1, inclusive. If the document speaks only about a given topic, then the topic appearance has a correlation strength of 1. In some implementations, the total of all confidence scores (correlations strengths) over all topics identified for a single text is a mathematical constant, e.g., 1. That is, a gain in correlation strength by one topic appearance represents a loss in correlation strength for another topic appearance. In some implementations, the confidence score is a measure of frequency for a set of topic-relevant terms appearing within the document.

At step 530, the content selection system 140 determines a sentiment score for a sentiment towards the topic. In some implementations, the sentiment score is determined by a sentiment analysis component 138, as a number in the range between −1 and +1, inclusive, as described above. In some implementations, the sentiment score is for the document's sentiment towards the topic. In some implementations, the sentiment score is for the viewing user's sentiment towards the topic, which may be evidenced within portions of the document authored by the user. In some implementations, the viewing user's sentiment towards the topic is evidenced through express means, e.g., the user may provide feedback. Feedback may be in the form of a rating, of a sentiment-expression, or as a comment added to the document. In some implementations, the sentiment of the document towards the topic is treated as the viewer's sentiment in the absence of an indication otherwise.

At step 540, the content selection system 140 identifies one or more candidate content items. In some implementations, an entire catalog of candidate content is contemplated and step 540 is skipped since the universe of candidate content is identified by default. In some implementations, a sub-set of the catalog is identified. For example, the content selection system 140 may identify candidate content items with a keyword or topic equivalent to, or synonymous with, a keyword or topic of the requested document.

At step 550, for each candidate content item, the content selection system 140 determines a predicted acceptance score based on acceptance history data associated with the candidate content item. In general, the prediction calculation includes an analysis of the circumstances of past content presentations compared to the present circumstances. In some implementations, the acceptance history data corresponds to past content presentation events wherein the content item was presented with a requested document. Each presentation event includes measurable characteristics including topics for the requested document, sentiment values for the topics, and a recipient's response to the presentation. This information may be structured, e.g., as in the table 300 illustrated in FIG. 3, and stored, e.g., in the content database 146. In some implementations, the content selection system 140 determines the predicted acceptance score using the formulas shown in FIG. 4. In some implementations, the predicted acceptance score is a predicted click-through rate.

At step 560, the content selection system 140 selects the candidate content item for presentation to the user from amongst a plurality of candidate content items, based, at least in part, on the predicted acceptance score. The content selection system 140 generally selects content for delivery where the predicted acceptance is high, that is, where there is a high likelihood of acceptance by the viewer. In some implementations, the predicted acceptance is a predicted click-through rate if the candidate content is delivered. In some implementations, the selection process considers certain correlation weights, relevancy factors, and sentiment scores. In some implementations, the selection process considers additional factors such as content provider budgets, presentation frequencies or throttles, or limitations based on the user device 110.

Figure 6:
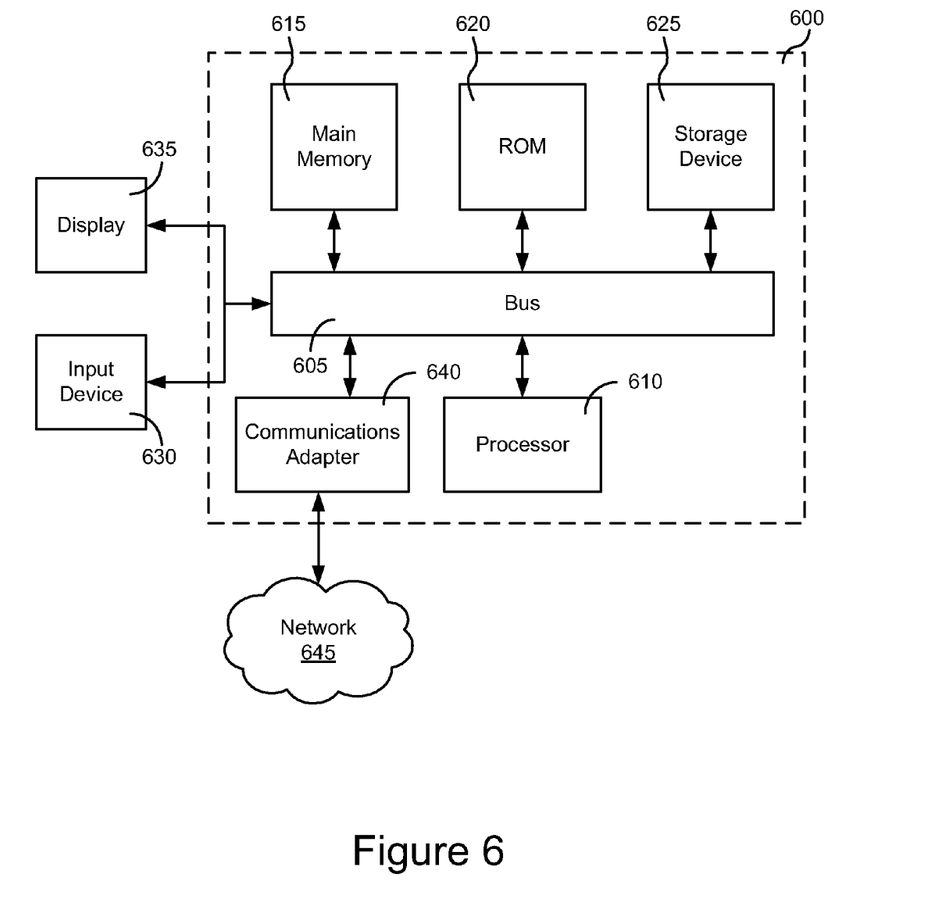
FIG. 6 is a block diagram illustrating an example computing system.

FIG. 6 illustrates a depiction of a computer system 600 that can be used, for example, to implement an illustrative user device 104, an illustrative advertisement system 108, an illustrative advertiser device 112, and/or various other illustrative systems that may be used in the implementation of an environment in which online advertisements may be provided as described in the present disclosure. The computing system 600 includes a bus 605 or other communication component for communicating information and a processor 610 coupled to the bus 605 for processing information. The computing system 600 also includes main memory 615, such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 610 or other static storage device coupled to the bus 605 for storing static information and instructions for the processor 610. A storage device 625, such as a non-transitory, solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information, and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

In some implementations, the computing system 600 may include a communications adapter 640, such as a networking adapter. Communications adapter 640 may be coupled to bus 605 and may be configured to enable communications with a computing or communications network 645 and/or other computing systems. In various illustrative implementations, any type of networking configuration may be achieved using communications adapter 640, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to implement illustrative implementations. Thus, implementations are not limited to any specific combination of hardware circuitry and software.

Although an example processing system has been described in FIG. 6, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console (e.g., Nintendo Wii, Microsoft Xbox, or Sony Playstation, of any version or edition), hotel television system, multi-purpose system, and/or any other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Amazon, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination in a single implementation. Conversely, various features that are described in the context of a single implementation can also be carried out in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method of selecting content for presentation to a user, the method comprising:
    identifying a plurality of topics for a document requested by a user;
    determining, for each topic of the plurality of topics, a respective confidence score for a correlation between the respective topic and the document, such that a sum of all determined confidence scores for the document is a mathematical constant, a first topic determined to have a first confidence score for a correlation between the first topic and the document;
    determining, for the first topic, a first sentiment score indicating a sentiment towards the first topic;
    determining, for a candidate content item, a predicted acceptance score based on the first confidence score, the first sentiment score, and acceptance history data for the candidate content item; and
    selecting the candidate content item for presentation to the user, by a computer system, from a plurality of candidate content items, based, at least in part, on the predicted acceptance score.

2. The method of claim 1, the method further comprising:
    wherein identifying the plurality of topics includes identifying a second topic of the plurality of topics for the document;
    wherein determining, for each topic of the plurality of topics, a respective confidence score includes determining a second confidence score for a correlation between the second topic and the document;
    determining a second sentiment score indicating a sentiment towards the second topic; and
    determining the predicted acceptance score for the candidate content item based on the second confidence score and the second sentiment score.

3. The method of claim 1, wherein the candidate content item has no previous presentations and the acceptance history data of the candidate content item comprises initialization information.

4. The method of claim 1, wherein the acceptance history data for the candidate content item comprises a significance indicator.

5. The method of claim 1, wherein determining the predicted acceptance score for the candidate content item comprises determining a ratio of sentiment scores.

6. The method of claim 1, wherein the user is an author of the document.

7. The method of claim 1, wherein the predicted acceptance score is a predicted click-through rate.

8. The method of claim 1, wherein the acceptance history data for the candidate content item comprises:
    a content topic for the candidate content item;
    a document topic for a document with which the candidate content item has been presented;
    an indicator of a response to a presentation of the candidate content item; and
    at least one historic sentiment score.

9. The method of claim 8, wherein the at least one historic sentiment score is one of
    a score indicating a sentiment towards the content topic,
    a score indicating a sentiment towards the document topic, and
    a score derived from a score indicating a sentiment towards the content topic and a score indicating a sentiment towards the document topic.

10. The method of claim 8, wherein the at least one historic sentiment score is an aggregate score.

11. A data processing system for selecting content for presentation to a user, the data processing system comprising one or more processors configured to:
    identify a plurality of topics for a document requested by a user;
    determine, for each topic of the plurality of topics, a respective confidence score for a correlation between the respective topic and the document, such that a sum of all determined confidence scores for the document is a mathematical constant, a first topic determined to have a first confidence score for a correlation between the first topic and the document;
    determine, for the first topic, a first sentiment score indicating a sentiment towards the first topic;
    determine, for a candidate content item, a predicted acceptance score based on the first confidence score, the first sentiment score, and acceptance history data for the candidate content item; and
    select the candidate content item for presentation to the user, by a computer system, from a plurality of candidate content items, based, at least in part, on the predicted acceptance score.

12. The system of claim 11,
    wherein to identify the plurality of topics includes identifying a second topic of the plurality of topics for the document;
    wherein to determine, for each topic of the plurality of topics, a respective confidence score includes determining a second confidence score for a correlation between the second topic and the document; and the one or more processors further configured to:

determine a second sentiment score indicating a sentiment towards the second topic; and determine the predicted acceptance score for the candidate content item based on the second confidence score and the second sentiment score.

13. The system of claim 11, wherein the user is an author of the document.

14. The system of claim 11, wherein the predicted acceptance score is a predicted click-through rate.

15. The system of claim 11, wherein the acceptance history data for previous presentations of a candidate content item comprises:

a content topic for the candidate content item;

a document topic for a document with which the candidate content item has been presented;

an indicator of a response to a presentation of the candidate content item; and at least one historic sentiment score.

16. The system of claim 15, wherein the at least one historic sentiment score is one of a score for a sentiment towards the content topic, a score for a sentiment towards the document topic, and a score derived from a score for a sentiment towards the content topic and a score for a sentiment towards the document topic.

17. The system of claim 15, wherein the at least one historic sentiment score is an aggregate score.

18. A non-transitory computer-readable storage medium storing processor-executable instructions, which, when executed by one or more processors, cause the one or more processors to:

identify a plurality of topics for a document requested by a user;

determine, for each topic of the plurality of topics, a respective confidence score for a correlation between the respective topic and the document, such that a sum of all determined confidence scores for the document is a mathematical constant, a first topic determined to have a first confidence score for a correlation between the first topic and the document;

determine, for the first topic, a first sentiment score indicating a sentiment towards the first topic;

determine, for a candidate content item, a predicted acceptance score based on the first confidence score, the first sentiment score, and acceptance history data for the candidate content item; and select the candidate content item for presentation to the user, by a computer system, from a plurality of candidate content items, based, at least in part, on the predicted acceptance score.

19. The non-transitory computer-readable storage medium of claim 18, wherein to identify the plurality of topics includes identifying a second topic of the plurality of topics for the document;

wherein to determine, for each topic of the plurality of topics, a respective confidence score includes determining a second confidence score for a correlation between the second topic and the document; and wherein the instructions further comprise instructions, which, when executed by one or more processors, cause the one or more processors to:

determine a second sentiment score indicating a sentiment towards the second topic; and determine the predicted acceptance score for the candidate content item based on the second confidence score and the second sentiment score.

* * * * *